US012614996B2

(12) United States Patent
Dange et al.

(10) Patent No.: US 12,614,996 B2
(45) Date of Patent: Apr. 28, 2026

(54) TUNABLE CIRCUIT FOR ROTARY POSITION DETECTION

(71) Applicant: TEXAS INSTRUMENTS INCORPORATED, Dallas, TX (US)

(72) Inventors: Vikram Dilip Dange, Ahmednagar (IN); Venkata Naresh Kotikelapudi, Bangalore (IN); Prasad Kulkarni, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 271 days.

(21) Appl. No.: 18/496,357

(22) Filed: Oct. 27, 2023

(65) Prior Publication Data

US 2024/0380343 A1     Nov. 14, 2024

(30) Foreign Application Priority Data

May 8, 2023 (IN) .............................. 202341032717

(51) Int. Cl.
    *H02P 7/00* (2016.01)

(52) U.S. Cl.
    CPC ........ *H02P 7/0094* (2013.01); *H02P 2203/09* (2013.01)

(58) Field of Classification Search
    CPC ........................... H02P 7/0094; H02P 2203/09
    See application file for complete search history.

(56) References Cited

U.S. PATENT DOCUMENTS 5,932,979 A * 8/1999 Sun ........................... B66B 1/30
                                                      318/400.4
2014/0028235 A1* 1/2014 Knezevic ............... G01D 3/032
                                                      318/490
2020/0343842 A1* 10/2020 Breynaert ............. H02P 7/0094

* cited by examiner

*Primary Examiner* — Zoheb S Imtiaz
(74) *Attorney, Agent, or Firm* — Xianghui Huang; Frank D. Cimino

(57) ABSTRACT

In some examples, an apparatus includes a filter having first and second inputs, a current signal input, and an output. The apparatus also includes a speed observer having a voltage signal input, a current signal input, and an output, the output of the speed observer coupled to the second input of the filter. The apparatus also includes a ripple counter having an input and an output, the input of the ripple counter coupled to the output of the filter. The apparatus also includes a ripple processor having first and second inputs, and an output, the first input of the ripple processor coupled to the output of the ripple counter, the second input of the ripple processor coupled to the output of the speed observer, and the output of the ripple processor coupled to the first input of the filter.

20 Claims, 6 Drawing Sheets

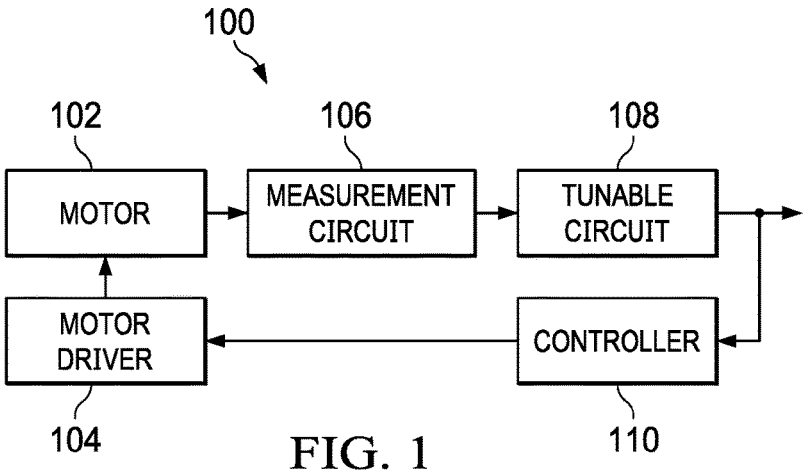
100
102                    106                    108
| MOTOR | → | MEASUREMENT CIRCUIT | → | TUNABLE CIRCUIT |
| MOTOR DRIVER | ← | CONTROLLER |
104            FIG. 1            110
100
106                                            108
MOTOR 102
MEASUREMENT CIRCUIT                    TUNABLE CIRCUIT
CURRENT MEASUREMENT CIRCUIT → FILTER → RIPPLE COUNTER → $\omega_{rip}$
202                    206            $k$            210
$\omega_{est}$
VOLTAGE MEASUREMENT CIRCUIT → SPEED OBSERVER → RIPPLE PROCESSOR
204                    208            212
| MOTOR DRIVER |                    | CONTROLLER |
104            FIG. 2            110

700

702 — RECEIVE CURRENT AND VOLTAGE SIGNALS

704 — FILTER THE CURRENT SIGNAL TO PROVIDE A FILTERED CURRENT SIGNAL

706 — DETERMINE AN ESTIMATED ROTATIONAL SPEED AND TUNE A FILTER BASED ON THE ESTIMATED ROTATIONAL SPEED

708 — DETERMINE A ROTATIONAL SPEED

710 — DETERMINE A k FACTOR AND TUNE THE FILTER BASED ON THE k FACTOR

TUNABLE CIRCUIT FOR ROTARY POSITION DETECTION

CROSS-REFERENCE TO RELATED APPLICATIONS

The present application claims priority to India Provisional Patent Application No. 202341032717, which was filed May 8, 2023, is titled "OBSERVER-TUNABLE SOGI ACTIVE BANDPASS FILTER FOR ACCURATE POSITION DETECTION OF BRUSHED DC MOTOR," and is hereby incorporated herein by reference in its entirety.

BACKGROUND

A rotary element, such as implemented in a direct current (DC) motor (e.g., a brushed DC motor) is controlled by a controller providing control signals to the motor that cause the rotary element to rotate. To accurately control a speed of the rotary element, and determine an amount of rotation of the rotary element and therefore a position of a device that moves based on the rotation of the rotary element, the controller, or another device, examines signals provided based on the rotation. The controller subsequently controls the motor and rotary device based on those determinations.

SUMMARY

In some examples, an apparatus includes a filter having first and second inputs, a current signal input, and an output. The apparatus also includes a speed observer having a voltage signal input, a current signal input, and an output, the output of the speed observer coupled to the second input of the filter. The apparatus also includes a ripple counter having an input and an output, the input of the ripple counter coupled to the output of the filter. The apparatus also includes a ripple processor having first and second inputs, and an output, the first input of the ripple processor coupled to the output of the ripple counter, the second input of the ripple processor coupled to the output of the speed observer, and the output of the ripple processor coupled to the first input of the filter.

In some examples, an apparatus includes a measurement circuit configured to determine and provide current and voltage signals, the current and voltage signals corresponding to rotational motion of a motor. The apparatus also includes a tunable circuit coupled to the measurement circuit. The tunable circuit is configured to receive the current and voltage signals. The tunable circuit is also configured to filter the current signal to provide a filtered current signal. The tunable circuit is also configured to determine an estimated rotational speed of the motor based on the current and voltage signals. The tunable circuit is also configured to determine a rotational speed of the motor based on the filtered current signal. The tunable circuit is also configured to determine a k factor of the filter according to the estimated rotational speed and the rotational speed. The tunable circuit is also configured to tune the filter according to the estimated rotational speed and the k factor.

In some examples, a method includes receiving current and voltage signals. The method also includes filtering, via a filter, the current signal to provide a filtered current signal. The method also includes determining an estimated rotational speed based on the current and voltage signals. The method also includes determining a rotational speed based on the filtered current signal. The method also includes determining a k factor of the filter according to the estimated rotational speed and the rotational speed. The method also includes tuning the filter according to the estimated rotational speed and the k factor.

BRIEF DESCRIPTION OF THE DRAWINGS

FIG. 1 is a block diagram of an example system.
FIG. 2 is a block diagram of the example system.

DETAILED DESCRIPTION

Figure 3:
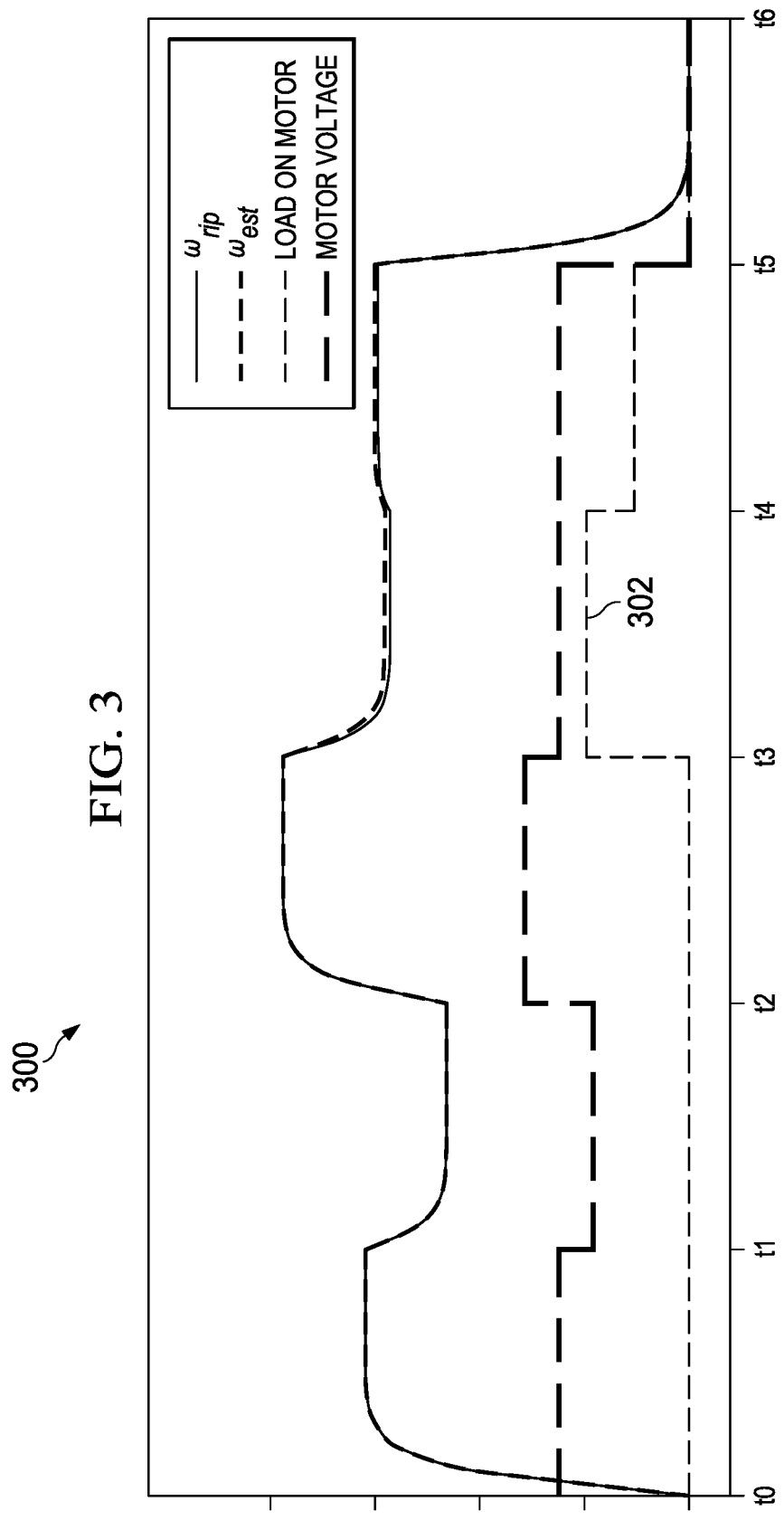
FIG. 3 is a diagram of example signal waveforms.

As described above, to accurately control a speed of a rotary element, such as implemented in a direct current (DC) motor (e.g., a brushed DC motor), a controller or other device determines an amount of rotation of the rotary element and therefore a position of a device that moves based on the rotation of the rotary element, by examining signals provided based on the rotation. The controller subsequently controls the motor and rotary device based on those determinations.

Various approaches are possible for obtaining the rotation and position information of the rotary element. One such approach includes mechanical sensors, such as magnetic or optical encoders. This approach may be comparatively high-accuracy, but at a higher complexity and higher implementation cost than other approaches. Another approach may be sensorless, performing ripple counting of ripples in a coil current waveform of the motor or associated with the rotary element. This approach may be comparatively low-accuracy, but at a lower complexity and lower implementation cost than sensor-based approaches. For example, the ripple counting approach may lack adaptability to changing conditions of the motor, such as changes in supply voltage, coil current, loading, or other various conditions related to the rotary element. This lack of adaptability may lead to missed ripples in the ripple count, or the false indication of ripples.

Examples of this disclosure provide for a tunable circuit for rotary position detection. The circuit may be tunable based on measured, estimated, observed, or received conditions of a rotary element, or a motor that includes the rotary element. In some examples, the circuit is implemented as a combination of discrete components, sub-circuits, or circuits that operate together to perform the functions described herein. In other examples, the circuit is implemented at least in part in a programmable manner, such as by providing instructions to a processing circuit to cause the processing circuit to perform various actions to implement at least some of the functionality described herein.

In an example, the tunable circuit receives a current signal and a voltage signal, each of the motor. The current signal may be representative of a coil current of the motor and the voltage signal may be representative of a supply voltage of the motor. Based on the received signals, the tunable circuit estimates an angular rotational speed ($\omega_{est}$) of the motor. In some examples, a rotational speed as used herein may be expressed in units of radians per second (rad/s). In other examples, a rotational speed as used herein may be expressed in units of Hertz (Hz), where rotational speed in rad/s is approximately equal to $2\pi*s$, where s is the speed in Hz. In some examples, based on $\omega_{est}$ the tunable circuit modifies a frequency of a filter of the tunable circuit. The filter may be a bandpass filter, and the modification may be controlling the bandpass filter to have a center frequency approximately equal to $\omega_{est}$. The filter may filter the current signal to remove noise, direct current (DC) offset, or other frequency components outside a frequency range or frequency band of interest (which may collectively be referred to herein as noise), from the current signal, providing a filtered current signal. In an example, the tunable circuit performs ripple counting of the filtered current signal to determine an angular rotational speed ($\omega_{rip}$) of the motor. Based on $\omega_{rip}$, the tunable circuit, or another device that receives $\omega_{rip}$, may determine a rotational or angular position of the rotary element.

FIG. 1 is a block diagram of an example system 100. In some examples, the system 100 is representative of at least a portion of an automobile, an autonomous device, a robotic device, an industrial machine device, or more generally any device which includes a rotary element and for which it may be useful to have knowledge of a rotational speed and/or rotational position of the rotary element. In an example, the system 100 includes a motor 102, a motor driver 104, a measurement circuit 106, a tunable circuit 108, and a controller 110 (which may be a microcontroller, a microprocessor, a processor, or the like). In some examples, at least some of the motor driver 104, measurement circuit 106, tunable circuit 108, and/or controller 110 are implemented on a same circuit board, on a same die, and/or within a same electrical component package. In some examples, at least some of the motor driver 104, measurement circuit 106, tunable circuit 108, and/or controller 110 are implemented by a same programmable component. In some examples, the tunable circuit 108 is implemented as, on, or using a field-programmable gate array (FPGA). In an example, the motor 102 is coupled to the motor driver 104 and the measurement circuit 106. The measurement circuit 106 is coupled to the tunable circuit 108. The controller 110 is coupled to the tunable circuit 108 and the motor driver 104.

In an example of operation of the system 100, the motor 102 includes a rotary element (not shown) that rotates. For example, in a brushed DC motor commutation causes the direction of current in the rotary element to reverse, thereby providing the torque for facilitating or causing mechanical motion of the rotary element. The commutation causes ripples to occur in a coil current of the motor 102. Counting these ripples, as described above, can provide information about a rotational speed and rotational position of the rotary element of the motor 102. However, out-of-phase commutation, such as caused by a geometry of the motor 102, operating voltage of the motor 102, transient signals, or other various characteristics or operational conditions of the motor 102 may cause the occurrence of noise in the coil current and/or variations in frequency of the ripples in the coil current. This noise and/or variation in frequency may reduce accuracy of rotational speed and position determined based on ripple counting, such as in examples in which the rotational speed and position are determined by fixed-frequency components.

The measurement circuit 106 measures a motor voltage and motor current (e.g., coil current) of the motor 102 and provides the resulting measurements to the tunable circuit 108. In some examples, the measurement circuit 106 includes one or more analog-to-digital converters (ADCs) that convert the motor voltage and motor current from an analog domain to a digital domain before providing the measurements to the tunable circuit 108.

The tunable circuit 108 receives the voltage and current signals from the measurement circuit 106 and performs ripple counting of the current signal. In some examples, to mitigate the challenges described above related to inaccurate ripple counting, the tunable circuit 108 tunes or otherwise modifies its operation based on the voltage and current signals. For example, based on the voltage and current signals, the tunable circuit 108 determines $\omega_{est}$. Based on $\omega_{est}$, the tunable circuit 108 modifies a center frequency of a bandpass filter which filters the current signal to tune the bandpass filter to the motor current. In some examples, by modifying the center frequency of the bandpass filter, the tunable circuit 108 tracks and adapts to changes in frequency of ripples in the motor current, mitigating errors in ripple count resulting from changes in operating conditions of the motor 102.

The tunable circuit 108 may filter the current signal using the tuned bandpass filter to provide a filtered current signal. The tunable circuit 108 may subsequently perform ripple counting on the filtered current signal to determine $\omega_{rip}$. In some examples, an error exists between $\omega_{est}$ and $\omega_{rip}$. This error may cause ripples of the current signal to have frequencies outside of the passband of the bandpass filter, decreasing accuracy of $\omega_{rip}$. To compensate for this error and mitigate the decrease in accuracy of $\omega_{rip}$, the tunable circuit 108 may determine a quality factor for the bandpass filter. Based on the quality factor, a width of the passband of the bandpass filter may be made wider or narrower. The tunable circuit 108 may determine a k factor of the bandpass filter, where the quality factor of the bandpass filter is inversely proportional to the k factor, and the k factor may be viewed as the fractional bandwidth of the filter. In some examples, the tunable circuit 108 determines the k factor based on various factors, including at least one or more of a constant defining a width of the passband for steady-state operation, the error between $\omega_{est}$ and $\omega_{rip}$, and/or the occurrence of transient changes in the motor voltage or motor current (such that, for example, the width of the passband increases during sudden transients in $\omega_{rip}$).

The tunable circuit 108 may provide $\omega_{rip}$ to the controller 110. In some examples, the controller 110 processes or otherwise manipulates $\omega_{rip}$, or multiple values of $\omega_{rip}$ determined across a period of time, to make determinations related to the motor 102. In an example, these determinations include at least a rotational position of the rotary element of the motor 102. Based on these determinations, the controller 110 may generate and provide a notification to a user, may modify a value of a control signal provided to the motor driver 104 for controlling/driving the motor 102, and/or may perform any other suitable action, the scope of which is not limited herein. The motor driver 104 may have any architecture suitable for receiving control signals from the controller 110 (or another device) and driving or controlling the motor 102 based on those control signals. In an example, the motor driver 104 is implemented as an H-bridge driver.

FIG. 2 is a block diagram of an example of the system 100. In an example, the measurement circuit 106 includes a current measurement circuit 202 and a voltage measurement circuit 204. In an example, the tunable circuit 108 includes a filter 206, a speed observer 208, a ripple counter 210, and a ripple processor 212. In some examples, the filter 206 is a bandpass filter. In some examples, the filter 206, speed observer 208, ripple counter 210, and ripple processor 212 are implemented programmatically, such as using a FPGA or other controller or processing circuit.

In an example, the current measurement circuit 202 and the voltage measurement circuit 204 each have inputs coupled to the motor 102. The bandpass filter 206 has a first input (e.g., a current signal input) coupled to the output of the current measurement circuit 202, and has second and third inputs, and an output. The speed observer 208 has a first input (e.g., a current signal input) coupled to the output of the current measurement circuit 202 and a second input (e.g., a voltage signal input) coupled to an output of the voltage measurement circuit 204. The speed observer 208 also has an output coupled to the second input of the filter 206. The ripple counter 210 has an input coupled to the output of the filter 206, and has an output. In an example, the output of the ripple counter 210 is an output of the tunable circuit 108. The ripple processor has a first input coupled to the output of the speed observer 208, a second input coupled to the output of the ripple counter 210, and has an output coupled to the third input of the filter 206.

In an example of operation of the system 100, the current measurement circuit 202 provides the current signal based on measuring the motor current, and the voltage measurement circuit 204 provides the voltage signal based on measuring the motor voltage, each as described above with respect to FIG. 1. The filter 206 receives the current signal and filters the current signal to provide the filtered current signal. In some examples, the filter 206 is a second-order generalized-integrator (SOGI). In other examples, the filter 206 may be of suitable architecture or type, such as a moving average finite impulse response (FIR) filter, a Gaussian FIR filter, a Butterworth infinite impulse response (IIR) filter, a Chebyshev IIR filter, or the like. The filter 206 may have a passband defined according to a low frequency cutoff and a high frequency cutoff, where the filter 206 attenuates frequency components of the current signal outside the range bounded by the low frequency cutoff and the high frequency. As described above, operational conditions of the motor 102 may cause variations in frequency of the motor current, and therefore the current signal. To compensate for these variations, the filter 206 is tunable. For example, a center frequency of the filter 206 (e.g., a frequency around which the passband is centered) is modifiable to track changes in frequency of the current signal.

To tune the filter 206, the speed observer 208 determines $\omega_{est}$ according to the current signal and the voltage signal. In various examples, the speed observer 208 determines $\omega_{est}$ also according to the current signal, the voltage signal, and other information about the motor 102, such as resistance, inductor, torque constant, back electromagnetic field (emf) constant, friction coefficient, inertia, or the like according to any suitable process(es), the scope of which is not limited herein. For example, theoretical operation of a motor may be defined by electrical and mechanical equations which may be specific to the motor or generic to multiple motors. Based on at least some of the above criteria, the speed observer 208 may solve the electrical and mechanical equations to determine $\omega_{est}$, which may be estimated based on theoretical or ideal operation of the motor. There may be numerous motor equations which may describe the theoretical operation of a motor, and numerous processes for solving those equations for an unknown variable given other known variables, such as the above criteria, and a particular set of motor equations or process of solving those motor equations is not limited herein. The speed observer 208 provides $\omega_{est}$ to the filter 206 to tune the center frequency of the filter 206 to approximately equal $\omega_{est}$. In an example, a transfer function of the filter 206 is shown below in equation 1, in which Y(s) is representative of an input signal, U(s) is representative of an output signal, s is an s-domain representation of a frequency, k is the k-factor of the filter 206 as described herein, and $\omega_0$ is a center frequency of the filter 206.

$$\frac{Y(s)}{U(s)} = \frac{k\omega_0 s}{s^2 + k\omega_0 s + \omega_0^2} \qquad (1)$$

The filter 206 provides the filtered current signal having a value determined according to the above equation 1 to the ripple counter 210. In an example, the ripple counter 210 compares the filtered current signal to a threshold signal to determine a comparison result. For example, responsive to the filtered current signal having a value greater than the threshold signal, the ripple counter 210 determines the comparison result as having an asserted value (e.g., a value of digital 1). The ripple counter 210 counts each asserted comparison result to determine a ripple count, from which the ripple counter 210 determines and provides $\omega_{rip}$. For example, a motor may include a certain number of commutations in one full revolution of the motor. Based on a count of the number of commutations of the motor, represented as ripples in the motor current, a number of full or partial revolutions of the motor may be determined. Further, by determining the time between two consecutive ripples, $\omega_{rip}$ may be determined. In some examples, the ripple counter 210 provides $\omega_{rip}$ as an output signal of the tunable circuit 108 to another device, such as the controller 110.

In some examples, $\omega_{rip}$ varies from $\omega_{est}$, as described above. This may result in inaccurate tuning of the filter 206, and therefore inaccuracy in the value of $\omega_{rip}$. To compensate for, or otherwise mitigate this error, in some examples, the ripple counter 210 provides $\omega_{rip}$ to the ripple processor 212. Based on $\omega_{rip}$ and $\omega_{est}$, the ripple processor 212 determines a k factor for controlling a quality factor, or passband width, of the filter 206. The ripple processor 212 provides the k factor to the filter 206 to widen or narrow the passband of the filter 206 based on the k factor, as shown above in equation 1. In an example, the ripple processor 212 determines the k factor according to the following equation 2.

$$k = \left( C1 + C2 * |(\omega_{est} - \omega_{rip})| + C3 * \left| \frac{d\omega}{dt} \right| \right) \qquad (2)$$

In equation 2, C1, C2, and C3 are any positive real number less than 1.0. In an example, C1, C2, and C3 are chosen to cause k to have a value between about 0.1 and about 0.9. The ripple processor 212 determines the k factor having multiple components. For example, C1 is a constant value that defines a width of the passband of the filter 206 in steady state conditions. A value of C1 may be application specific, but in some examples may be in a range of about 0.4 to about 0.5. The term $C2 * |(\omega_{est} - \omega_{rip})|$ compensates for error between the determined value of $\omega_{rip}$ and the estimated value of $\omega_{est}$, widening the passband in response to an increase in the error. In some examples, C2 has a value determined according to $C2 = x / \max(|\omega_{est} - \omega_{rip}|)$, where max $(|\omega_{est} - \omega_{rip}|)$ represents a worst case error in parametric variation error, x has any suitable value selected to cause k to have a value between about 0.1 and about 0.9, and C2 is any real number. In an example, x has a value of about 0.2. The term $$C3 * \left| \frac{d\omega}{dt} \right|$$

compensates for changes in performance of the motor 102 during sudden load or voltage transients, widening the passband in response to sudden load or voltage transients. In some examples, a value of C3 is determined based on parameters of the motor 102, such as resistance, inductor, torque constant, back electromagnetic field (emf) constant, friction coefficient, inertia, the scope of which is not limited herein, and has any suitable value selected to cause k to have a value between about 0.1 and about 0.9.

By tuning the filter 206 based on $\omega_{est}$ and the k factor determined based on $\omega_{rip}$ and $\omega_{est}$, in some examples, accuracy of $\omega_{rip}$ is increased in comparison to ripple counting approaches that lack such tuning. Also, by tuning the filter 206 based on $\omega_{est}$ and the k factor determined based on $\omega_{rip}$ and $\omega_{est}$, in some examples, accuracy of the sensorless ripple counting approach of this disclosure may be approximately equal to, or greater than, accuracy of mechanical, sensor-based approaches, as described above.

FIG. 3 is a diagram 300 of example signal waveforms. The diagram 300 includes at least some signal waveforms which may be present in some examples of the system 100. For example, the diagram 300 includes $\omega_{est}$, $\omega_{rip}$, the motor voltage, and a signal 302 representative of a load placed on the motor 102. As shown by the diagram 300, $\omega_{est}$ and $\omega_{rip}$ vary with changes in the motor voltage or load placed on the motor 102. For example, responsive to the motor voltage increasing, such as between t0 and t1, t2 and t3, or a decrease in load, such as between t4 and t5, $\omega_{est}$ and $\omega_{rip}$ also increase. Similarly, responsive to the motor voltage decreasing, such as between t1 and t2, t3 and t4, or t5 and t6, $\omega_{est}$ and $\omega_{rip}$ also decrease. The diagram 300 further shows that an error may exist between $\omega_{est}$ and $\omega_{rip}$, such as shown between t3 and t4. As also shown by the diagram 300, responsive to an increase in the load placed on the motor 102, $\omega_{est}$ and $\omega_{rip}$ decrease. Conversely, responsive to a decrease in the load placed on the motor 102, $\omega_{est}$ and $\omega_{rip}$ increase.

Figure 4:
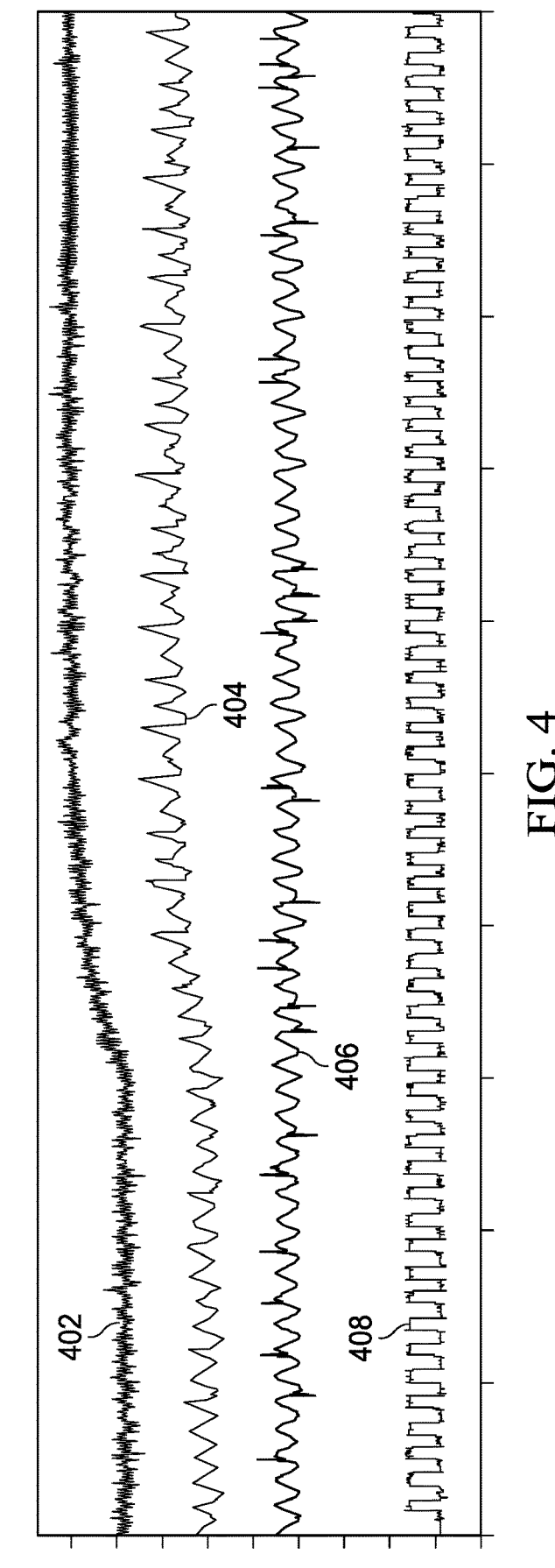
FIG. 4 is a diagram of example signal waveforms.

FIG. 4 is a diagram 400 of example signal waveforms. The diagram 400 includes at least some signal waveforms which may be present in some examples of the system 100. For example, the diagram 400 includes a signal 402 representative of the motor voltage, a signal 404 representative of the motor current, a signal 406 representative of the filtered current signal, and a signal 408 representative of an output of the ripple counter 210. Although one output signal of the ripple counter 210 is described herein, in various examples the ripple counter 210 provides any suitable number of output signals. In some examples, the ripple counter 210 provides the signal 408 as a pulse width modulation (PWM) signal having pulses representative of each ripple of the motor current (e.g., signal 404), to enable another component, such as a controller or processor, to determine information based on the signal 408. In some examples, the ripple counter 210 determines information based on the signal 408, such as a rotational speed of the motor, a position of the motor, or the like, and provides this determined information as the output signal(s) of the ripple counter 210. As shown by the diagram 400, as the signal 402 increases in value, the signal 404 similarly increases based on an increasing DC signal component. However, the filter 206, tuned based on the determined $\omega_{est}$ and k factor, filter out the DC signal component of signal 404, as shown by the signal 406. As a result, each ripple of the signal 404 is represented in the signal 406.

Figure 5:
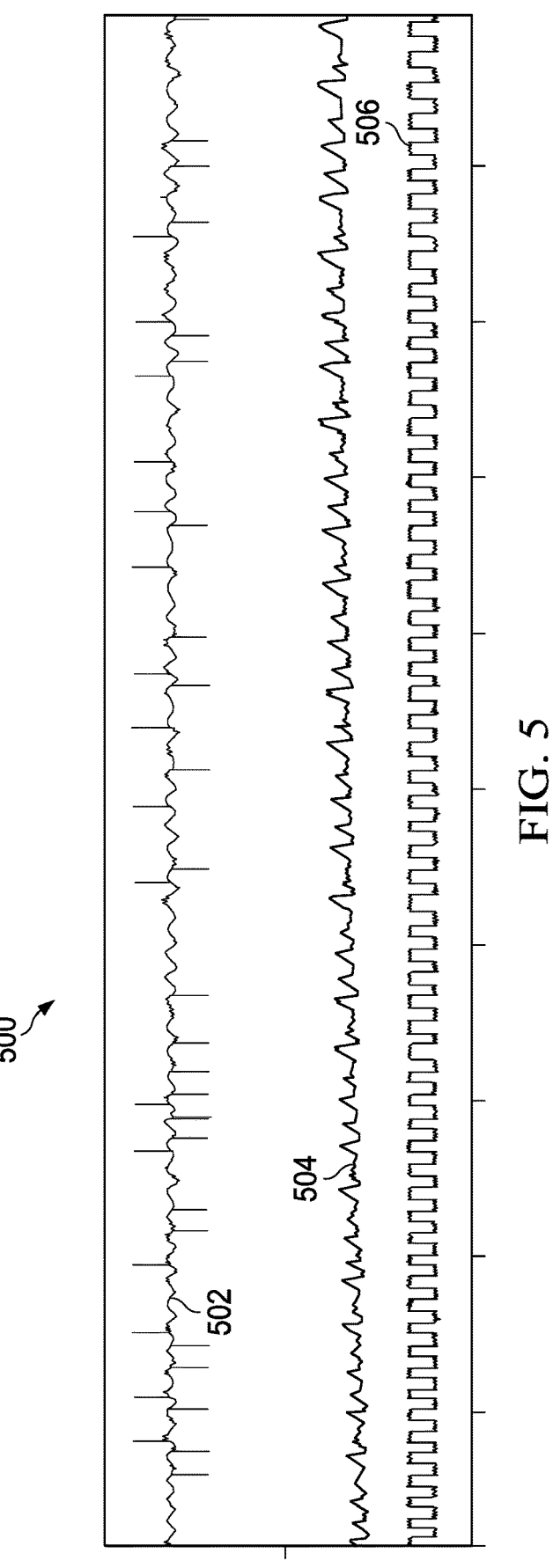
FIG. 5 is a diagram of example signal waveforms.

FIG. 5 is a diagram 500 of example signal waveforms. The diagram 500 includes at least some signal waveforms which may be present in some examples of the system 100. For example, the diagram 500 includes a signal 502 representative of the filtered current signal, a signal 504 representative of the motor current, and a signal 506 representative of an output of the ripple counter 210. As shown by the diagram 500, effects of loading on the motor 102 can cause transients, frequency variation, and magnitude variation in the signal 504. These variations in the signal 504 can lead to decreased ripple counting accuracy in ripple counting approaches that are fixed, or non-tunable. However, as described above and shown by the signal 502, the filter 206, tuned based on the determined $\omega_{est}$ and k factor, compensates for these variations in the signal 504 by modifying the center frequency and/or the passband width of the filter 206 responsive to operating conditions of the motor 102, as represented at least in part in the signal 504. As a result, each ripple of the signal 502 is represented in the signal 506.

Figure 6:
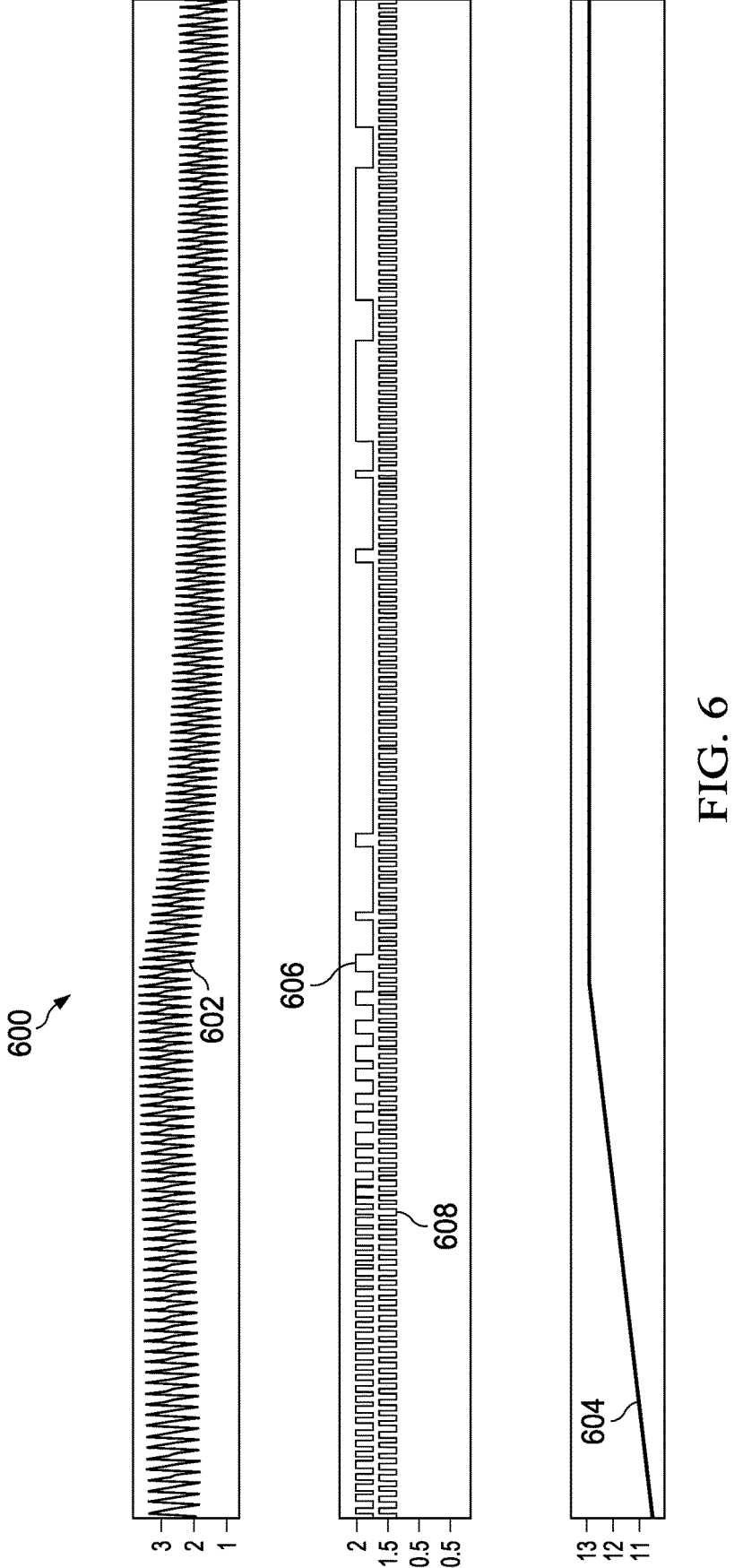
FIG. 6 is a diagram of example signal waveforms.

FIG. 6 is a diagram 600 of example signal waveforms. The diagram 600 shows an example comparison of performance of a non-tunable ripple counting approach, and the tunable ripple counting of this description. The diagram 600 includes a signal 602 representative of the motor current, a signal 604 representative of the motor voltage, a signal 606 representative of an output of a ripple counter in a non-tunable ripple counting approach, and a signal 608 representative of an output of a ripple counter in the tunable ripple counting approach of this description. As shown by the diagram 600, variations can occur in value of the signal 602 and/or the signal 604. These variations may cause a magnitude of the signal 602 to rise above or fall below a threshold for measurement, resulting in inaccurate pulse detection, as shown by the signal 606. Similarly, the variations may cause a frequency of the signal 602 to increase above or decrease below a passband of a non-tunable filter, also resulting in inaccurate pulse detection, as shown by the signal 606. In contrast, the signal 608 includes accurately determined representations of a greater number of ripples in the signal 602 than does the signal 606.

In some examples, the increased accuracy of the signal 608 compared to the signal 606 for ripple appearing in the signal 602 results from tuning of the center frequency of a filter which filters the signal 602 (or a derivative signal of the signal 602, such as a digital domain representation of the signal 602). In some examples, the increased accuracy of the signal 608 compared to the signal 606 for ripple appearing in the signal 602 results, additionally or alternatively, from tuning of the passband width of the filter which filters the signal 602 (or the derivative signal of the signal 602, such as the digital domain representation of the signal 602). Thus, in some examples, a tunable filter as described herein may provide performance substantially similar in accuracy to a high-complexity, mechanical, sensor-based speed and position determination approach, while including the low-complexity, sensorless-based speed and position determination of a ripple counting approach.

Figure 7:
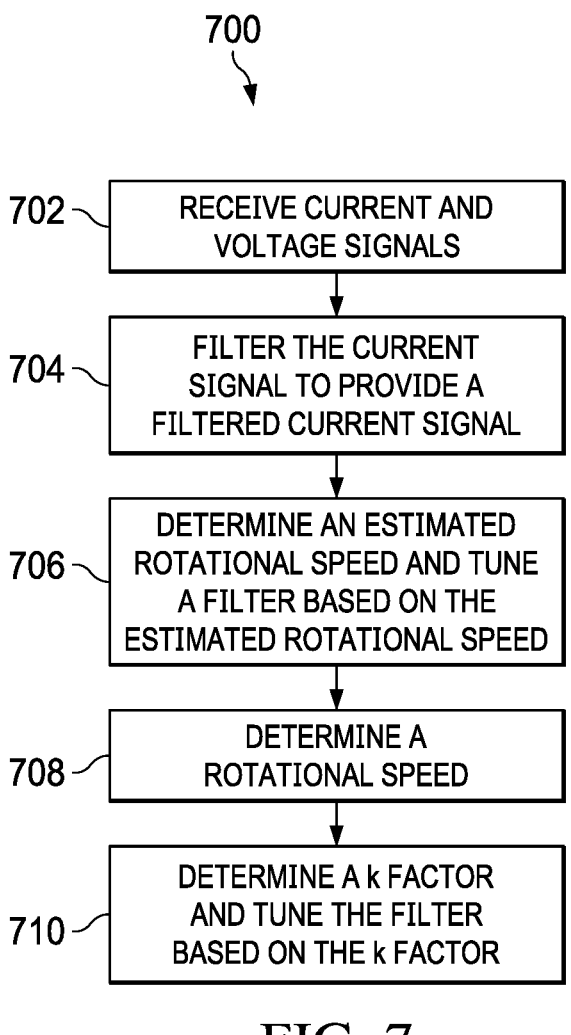
FIG. 7 is a flow diagram of an example method.

FIG. 7 is a flow diagram of an example method 700. In some examples, the method 700 is implemented by the tunable circuit 108. In some examples, the method 700 is implemented by a processing device, such as a controller, microcontroller, processor, microprocessor, FPGA, application specific integrated circuit (ASIC), or other like device executing one or more computer-readable instructions read or received from a non-transitory memory to implement or provide the functionality described herein with respect to the tunable circuit 108, or any of its components.

At operation 702, current and voltage signals are received. In some examples, the current and voltage signals are received in digital domain representations, while in other examples the current and voltage signals are received in analog domain representations and are converted to digital domain representations. Although not shown in FIG. 7, in some examples operation 702 may be preceded by a measurement operation in which motor current and voltage signals are captured, recorded, observed, or otherwise obtained from a motor or other device having a rotary element to form the current and voltage signals, respectively.

At operation 704, the current signal is filtered to provide a filtered current signal. In some examples, the filtering is performed via a tunable filter. For example, the filter may be a bandpass filter having a tunable, programmable, or changeable center frequency and passband width. In some examples, the filter is a SOGI.

At operation 706, $\omega_{est}$ is determined and the filter is tuned based on $\omega_{est}$. In some examples, $\omega_{est}$ is determined based on the current and voltage signals. $\omega_{est}$ may be further determined based on motor parameters, such as resistance, inductor, torque constant, back electromagnetic field (emf) constant, friction coefficient, inertia, etc. In some examples, $\omega_{est}$ is determined by the speed observer 208. In an example, $\omega_{est}$ is provided to the filter to tune the filter, such as by controlling the filter to modify a center frequency of its passband to approximately equal $\omega_{est}$.

At operation 708, $\omega_{rip}$ is determined. In some examples, $\omega_{rip}$ is determined by performing ripple counting of the filtered current signal, such as by the ripple counter 210. The ripple counting may be performed according to any suitable process, the scope of which is not limited herein. For example, the filtered current signal may be compared to a threshold signal, and responsive to the filtered current signal having a value greater than the threshold signal, a ripple may be identified. In some examples, the presence of a ripple in the filtered current signal may be indicated by a pulse signal in a ripple counter output signal.

At operation 710, a k factor is determined and the filter is tuned based on the k factor. In some examples, the k factor is determined based on one or more constant values, $\omega_{est}$, and $\omega_{rip}$, such as described above with respect to the ripple processor 212 of FIG. 2. In an example, the k factor is provided to the filter to tune the filter, such as by controlling the filter to modify a quality factor of the filter, and therefore a width of its passband. In some examples, the quality factor of the filter is inversely proportional to the determined k factor.

Although not shown in FIG. 7, in various examples, the method 700 may include additional operations, such as controlling a driver to drive the motor based at least in part on $\omega_{rip}$, determining a rotational position of a rotary element of the motor based on $\omega_{rip}$, providing a notification to a user or other device based on $\omega_{rip}$ or information derived from $\omega_{rip}$, or the like.

The operations of the method 700 may be performed in any order, which may be different than the order in which the operations are described herein. For example, operation 706 may be performed before operation 704, or at least some of operation 704 and operation 706 may be performed concurrently.

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

A device that is "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof.

A circuit or device that is described herein as including certain components may instead be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be coupled to at least some of the passive elements and/or the sources to form the described structure either at a time of manufacture or after a time of manufacture, for example, by an end-user and/or a third-party.

While certain components may be described herein as being of a particular process technology, these components may be exchanged for components of other process technologies. Circuits described herein are reconfigurable to include the replaced components to provide functionality at least partially similar to functionality available prior to the component replacement. Components shown as resistors, unless otherwise stated, are generally representative of any one or more elements coupled in series and/or parallel to provide an amount of impedance represented by the shown resistor. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor.

Uses of the phrase "ground voltage potential" in the foregoing description include a chassis ground, an Earth ground, a floating ground, a virtual ground, a digital ground, a common ground, and/or any other form of ground connection applicable to, or suitable for, the teachings of this description. In this description, unless otherwise stated, "about," "approximately" or "substantially" preceding a parameter means being within +/−10 percent of that parameter. Modifications are possible in the described examples, and other examples are possible within the scope of the claims.

As used herein, the terms "terminal," "node," "interconnection," "pin," and "lead" are used interchangeably. Unless specifically stated to the contrary, these terms are generally used to mean an interconnection between or a terminus of a device element, a circuit element, an integrated circuit, a device, or a semiconductor component. Furthermore, a voltage rail or more simply a "rail," may also be referred to as a voltage terminal and may generally mean a common node or set of coupled nodes in a circuit at the same potential.

What is claimed is:
1. An apparatus, comprising:
a filter having first and second inputs, a current signal input, and an output;

a speed observer having a voltage signal input, a current signal input, and an output, the output of the speed observer coupled to the second input of the filter;

a ripple counter having an input and an output, the input of the ripple counter coupled to the output of the filter; and a ripple processor having first and second inputs, and an output, the first input of the ripple processor coupled to the output of the ripple counter, the second input of the ripple processor coupled to the output of the speed observer, and the output of the ripple processor coupled to the first input of the filter.

2. The apparatus of claim 1, wherein the speed observer is configured to:

receive a current signal at the current signal input;

receive a voltage signal at the voltage signal input, the current signal and the voltage signal corresponding to rotational motion of a motor; and determine an estimated rotational speed of the motor based on the current signal and the voltage signal.

3. The apparatus of claim 2, wherein the filter is configured to:

receive the current signal; and filter the current signal to provide a filtered current signal by attenuating frequency components of the current signal having a frequency outside of a passband of the filter.

4. The apparatus of claim 3, wherein the apparatus is configured to tune a center frequency of the passband of the filter to a value of the estimated rotational speed of the motor.

5. The apparatus of claim 3, wherein the ripple counter is configured to:

receive the filtered current signal;

compare the filtered current signal to a threshold signal; and responsive to a value of the filtered current signal being greater than a value of the threshold signal, indicating, in a ripple counter output signal, presence of a ripple in the filtered current signal.

6. The apparatus of claim 5, wherein the ripple processor is configured to:

receive the ripple counter output signal; and determine a k factor associated with the filter, wherein a quality factor of the filter is inversely proportional to the k factor and a width of the passband of the filter is determined based on the quality factor of the filter.

7. The apparatus of claim 6, wherein the apparatus is configured to tune the width of the passband of the filter according to a quality factor of the filter determined inversely proportional to the k factor.

8. The apparatus of claim 6, wherein the ripple processor is configured to determine the k factor having a steady-state component, an error-dependent component, and a transient component.

9. An apparatus, comprising:

a measurement circuit configured to determine and provide current and voltage signals, the current and voltage signals corresponding to rotational motion of a motor; and a tunable circuit coupled to the measurement circuit and configured to:

receive the current and voltage signals;

filter the current signal to provide a filtered current signal;

determine an estimated rotational speed of the motor based on the current and voltage signals;

determine a rotational speed of the motor based on the filtered current signal;

determine a k factor of the filter according to the estimated rotational speed and the rotational speed; and tune the filter according to the estimated rotational speed and the k factor.

10. The apparatus of claim 9, wherein the filter is a second-order generalized-integrator having a passband width defined according to a quality factor of the filter, wherein the quality factor of the filter is inversely proportional to the k factor.

11. The apparatus of claim 10, wherein the tunable circuit is configured to tune a center frequency of the passband to have a value determined according to the estimated rotational speed.

12. The apparatus of claim 10, wherein the tunable circuit is configured to tune the passband width according to the determined k factor.

13. The apparatus of claim 9, wherein the tunable circuit is configured to determine the k factor having:

a steady-state component represented by a first constant value;

an error-dependent component determined according to a second constant value multiplied by an absolute value of a difference between the estimated rotational speed of the motor and the rotational speed of the motor; and a transient component determined according to a third constant value multiplied by an absolute value of a change in the rotational speed over time.

14. The apparatus of claim 9, further comprising:

a controller configured to receive the rotational speed of the motor and provide a control signal based on the rotational speed of the motor; and a driver configured to receive the control signal and provide a drive signal based on the control signal, the drive signal for driving the motor.

15. A method, comprising:

receiving current and voltage signals;

filtering, via a filter, the current signal to provide a filtered current signal;

determining an estimated rotational speed based on the current and voltage signals;

determining a rotational speed based on the filtered current signal;

determining a k factor of the filter according to the estimated rotational speed and the rotational speed; and tuning the filter according to the estimated rotational speed and the k factor.

16. The method of claim 15, further comprising tuning the filter according to the estimated rotational speed by tuning a center frequency of a passband of the filter to a value proportional to the estimated rotational speed.

17. The method of claim 15, further comprising determining the k factor having a steady-state component, an error-dependent component, and a transient component.

18. The method of claim 17, further comprising determining the k factor having:

the steady-state component represented by a first constant value;

the error-dependent component determined according to a second constant value multiplied by an absolute value of a difference between the estimated rotational speed and the rotational speed; and the transient component determined according to a third constant value multiplied by an absolute value of a change in the rotational speed over time.

13

14

19. The method of claim 15, further comprising tuning the filter according to the k factor by tuning a width of a passband of the filter according to a quality factor determined having a value inversely proportional to the k factor.

20. The method of claim 15, further comprising providing a motor control signal having a value determined according to the rotational speed.

\* \* \* \* \*